US008688829B2

(12) United States Patent
Lee et al.

(10) Patent No.: US 8,688,829 B2
(45) Date of Patent: Apr. 1, 2014

(54) METHOD AND SYSTEM OF BINDING SENSORS AND ACTUATORS AUTOMATICALLY

(75) Inventors: Yueh Feng Lee, Taipei (TW); Hsin Sheng Liu, Xinwu Township, Taoyuan County (TW); Ming Shyan Wei, Tainan (TW); Yang Jung Li, Kaohsiung (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 107 days.

(21) Appl. No.: 13/235,649

(22) Filed: Sep. 19, 2011

(65) Prior Publication Data

US 2012/0226366 A1    Sep. 6, 2012

(30) Foreign Application Priority Data

Mar. 2, 2011    (TW) .............................. 100106816 A

(51) Int. Cl.
*G06F 15/173* (2006.01)
*G06F 15/18* (2006.01)
*H01G 7/02* (2006.01)

(52) U.S. Cl.
USPC ............. 709/224; 709/223; 706/44; 361/233

(58) Field of Classification Search
USPC .......................................................... 709/224
See application file for complete search history.

(56) References Cited

U.S. PATENT DOCUMENTS

| | | | |
|---|---|---|---|
| 7,594,220 B2 | 9/2009 | Kodosky et al. | |
| 7,600,218 B2 | 10/2009 | Yamamoto et al. | |
| 7,681,203 B2 | 3/2010 | Mandato et al. | |
| 7,693,581 B2 | 4/2010 | Callaghan et al. | |
| 7,734,572 B2 | 6/2010 | Wiemeyer et al. | |
| 2007/0162576 A1* | 7/2007 | Sinclair et al. | ............... 709/223 |
| 2008/0196083 A1 | 8/2008 | Parks et al. | |
| 2009/0021884 A1* | 1/2009 | Nakamura | ................... 361/233 |
| 2009/0100045 A1 | 4/2009 | Feng et al. | |
| 2009/0182697 A1* | 7/2009 | Massaquoi | ..................... 706/44 |
| 2011/0225296 A1* | 9/2011 | Hong et al. | .................. 709/224 |

FOREIGN PATENT DOCUMENTS

| | | |
|---|---|---|
| TW | 200941892 A | 10/2009 |
| WO | 2010/055962 A1 | 5/2010 |

OTHER PUBLICATIONS

Yueh-Feng, Hsin Sheng Liu, Ming-Shyan Wei, and Chun-Hao Peng. A Flexible Binding Mechanism for ZigBee Sensors. Dec. 7-10, 2009.*
"A flexible Binding Mechanism for Zigbee Sensors" by Yueh-Feng, Hsin Sheng Liu, Ming-Shyan Wei, and Chun-Hao Peng, Conference Publications of 2009 5th International Conference on Intelligent Sensors, Sensor Networks and Information Processing, Date of Conference: Dec. 7-10, 2009.

(Continued)

*Primary Examiner* — David Lazaro
*Assistant Examiner* — Mahran Abu Roumi
(74) *Attorney, Agent, or Firm* — Egbert Law Offices, PLLC

(57) ABSTRACT

The method for binding a sensor and an actuator can be categorized into three types: manual binding, automatic binding and semi-automatic binding. Manual binding methods increase users' operational burden when a great number of sensors and actuators are to be bound. The current hard-coded automatic binding method suffers from lack of versatility. The template-based semi-automatic binding method still requires users to input some information manually. The disclosure provides an automatic binding method, which can automatically and reasonably bind the functions of a sensor and an actuator without user input, in a sensor network comprising a plurality of sensors and actuators.

15 Claims, 15 Drawing Sheets

(56) References Cited

OTHER PUBLICATIONS

Office Action issued on Nov. 8, 2013 from TIPO regarding the TW counterpart application.

ZigBee alliance, "ZigBee Specification," ZigBee Specification Document 053474r18, Jun. 18, 2009, p. 122-125.

IEEE, "Part 15.4: Wireless Medium Access Control (MAC) and Physical Layer (PHY) Specifications for Low-Rate Wireless Personal Area Networks (WPANs)". IEEE Std 802 15.4-2006, Sep. 8, 2006. p. 62.

Open Geospatial Consortium Inc., "OpenGIS® Sensor Model Language (SensorML) Implementation Specification", Sensor Model Language OGC 05-086r2, Feb. 1, 2006, p. 51-53.

Cory A. Henson et al., "SemSOS: Semantic Sensor Observation Service", 2009 International Symposium on Collaborative Technologies and Systems, Jan. 1, 2009.

David J. Russomanno et al., "Building a Sensor Ontology: A Practical Approach Leveraging ISO and OGC Models", Proceedings of the 2005 International Conference on Artificial Intelligence, Jan. 1, 2005.

\* cited by examiner

| C0Ep:V0Ap | C0Ep:S0Ap |
|---|---|
| C0En:V0An | C0En:S0Anx |
|  | C0En:S0Any |

| | | | | | | | |
|---|---|---|---|---|---|---|---|
| W0Ep:L0Ap<br>W0En:L0An | W0Ep:L1Ap<br>W0En:L1An | W0Ep:L2Ap<br>W0En:L2An | W0Ep:L3Ap<br>W0En:L3An | W0Ep:L4Ap<br>W0En:L4An | W0Ep:L5Ap<br>W0En:L5An | W0Ep:L6Ap<br>W0En:L6An | W0Ep:L7Ap<br>W0En:L7An |
| W1Ep:L0Ap<br>W1En:L0An | W1Ep:L1Ap<br>W1En:L1An | W1Ep:L2Ap<br>W1En:L2An | W1Ep:L3Ap<br>W1En:L3An | W1Ep:L4Ap<br>W1En:L4An | W1Ep:L5Ap<br>W1En:L5An | W1Ep:L6Ap<br>W1En:L6An | W1Ep:L7Ap<br>W1En:L7An |
| W2Ep:L0Ap<br>W2En:L0An | W2Ep:L1Ap<br>W2En:L1An | W2Ep:L2Ap<br>W2En:L2An | W2Ep:L3Ap<br>W2En:L3An | W2Ep:L4Ap<br>W2En:L4An | W2Ep:L5Ap<br>W2En:L5An | W2Ep:L6Ap<br>W2En:L6An | W2Ep:L7Ap<br>W2En:L7An |
| W3Ep:L0Ap<br>W3En:L0An | W3Ep:L1Ap<br>W3En:L1An | W3Ep:L2Ap<br>W3En:L2An | W3Ep:L3Ap<br>W3En:L3An | W3Ep:L4Ap<br>W3En:L4An | W3Ep:L5Ap<br>W3En:L5An | W3Ep:L6Ap<br>W3En:L6An | W3Ep:L7Ap<br>W3En:L7An |
| W4Ep:L0Ap<br>W4En:L0An | W4Ep:L1Ap<br>W4En:L1An | W4Ep:L2Ap<br>W4En:L2An | W4Ep:L3Ap<br>W4En:L3An | W4Ep:L4Ap<br>W4En:L4An | W4Ep:L5Ap<br>W4En:L5An | W4Ep:L6Ap<br>W4En:L6An | W4Ep:L7Ap<br>W4En:L7An |
| W5Ep:L0Ap<br>W5En:L0An | W5Ep:L1Ap<br>W5En:L1An | W5Ep:L2Ap<br>W5En:L2An | W5Ep:L3Ap<br>W5En:L3An | W5Ep:L4Ap<br>W5En:L4An | W5Ep:L5Ap<br>W5En:L5An | W5Ep:L6Ap<br>W5En:L6An | W5Ep:L7Ap<br>W5En:L7An |

| M0Ep:L0Ap<br>M0En:L0An | M0Ep:L1Ap<br>M0En:L1An | M0Ep:L2Ap<br>M0En:L2An | M0Ep:L3Ap<br>M0En:L3An | M0Ep:L4Ap<br>M0En:L4An | M0Ep:L5Ap<br>M0En:L5An | M0Ep:L6Ap<br>M0En:L6An | M0Ep:L7Ap<br>M0En:L7An |
|---|---|---|---|---|---|---|---|

| D0Ep:S0Ap |
|---|
| D0En:S0An |

FIG. 11

METHOD AND SYSTEM OF BINDING SENSORS AND ACTUATORS AUTOMATICALLY

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present disclosure relates to a method and a system of binding sensors and actuators automatically.

2. Description of Related Art Including Information Disclosed Under 37 CFR 1.97 and 37 CFR 1.98

In recent years, sensor networks have been widely applied in home automation and factory monitoring. The basic function of the sensor network is the activation of an actuator to perform a specific operation instruction when a sensor senses a specific value. Passing an operation instruction between the sensor and the actuator is called binding. For example, the binding between a lamp switch and a lamp comprises two operations: turning on the lamp when the lamp switch is moved to an "on" position, and turning off the lamp when the lamp switch is moved to an "off" position.

In the application of the sensor network, determining a proper method of processing a measured value of a sensor and an instruction of an actuator of the sensor network, and determining a method of establishing binding have become very important issues. Currently the methods for binding can be categorized into three types: manual binding, automatic binding, and semi-automatic binding. When the manual binding method is used, an end user or an engineer performs steps of selecting a sensor, selecting a sensor event, selecting an actuator, and selecting an actuator action. When the automatic binding method is used, a system automatically performs the steps of selecting a sensor, selecting a sensor event, selecting an actuator, and selecting an actuator action. If the automatic method is used to bind the lamp switch and the lamp, after deployment the user can directly perform the two actions of turning on the lamp by moving the lamp switch to an "on" position and turning off the lamp by moving the lamp switch to an "off" position. That is, the user is not required to perform steps of selecting the lamp switch, selecting the turning on, selecting the lamp, and selecting the turning on of the lamp. In the semi-automatic binding method, a portion of the binding process is performed by a user, and the remaining portion of the binding process is performed by a system automatically.

In the manual binding method, a system normally provides a user interface for a user to select a sensor, a sensor event, an actuator, and an actuator action. However, many steps are involved in this method, and when the number of sensors and the number of actuators are large, the user has to bind each sensor and each actuator, thereby making the process complicated. In other words, the user has to spend a lot of time before completing the binding. In some cases, binding cannot be established because the user, due to lack of knowledge, presses buttons of a sensor that is not matched to an actuator. In an existing implementation of automatic binding with a specified sensor and a specified actuator, a specific sensor event and a specific actuator action are bound according to a fixed rule. For example, when a passive infrared sensor and an alarm exist, a detection event and an alarm action are bound together. The implementation of the automatic binding has a major defect in that binding can only be established by a predefined rule. For example, a binding cannot be established between a passive infrared sensor and a lamp if there is no written rule concerning the passive infrared sensor and the lamp. Another defect of the implementation of the automatic binding is that the rule has to be updated frequently; otherwise, the binding is likely to fail. For example, if a new sensor called a human body ultrasonic sensor is added, the implementation of the automatic binding needs to design a new rule for the new sensor. In addition, a wrongly connected binding may be established when multiple sensors and actuators exist. For example, in an apartment having multiple rooms, in which each of the rooms has a lamp switch and a lamp, a lamp switch in a kitchen and a lamp in a lavatory may be bound, or a lamp switch in the lavatory and a vestibule lamp may be bound erroneously.

Among semi-automatic binding methods, two methods are usually used. In the first method, a user selects a sensor and an actuator, and a system selects a sensor event and an actuator action. In the second method, a user selects a sensor and a sensor event, and a system selects an actuator and an actuator action.

The first semi-automatic binding method has the following two operation manners. In the first operation manner, in order to require a user to first press a button of a sensor, and then press a button of an actuator, the system combines functions of the sensor and the actuator according to a preset rule. For example, the user presses a button on a lamp switch, and then presses a button on a lamp. According to the rule preset by the system, binding of a moving to an on position event of the lamp switch and a turning on action of the lamp, as well as binding of a moving to an off position event of the lamp switch and a turning off action of the lamp are established. In the second operation manner, the system provides application software of a graphical user interface for a user to select a sensor and an actuator, and the system combines functions of the sensor and the actuator according to a preset rule. For example, the user selects an icon of a lamp switch from the graphical user interface, and selects an icon of a lamp from the binding targets of the icon. After the user presses a binding button, binding of a moving to an on position event of the lamp switch and a turning on action of the lamp as well as binding of a moving to an off position event of the lamp switch and a turning off action of the lamp are established.

In the second semi-automatic binding method, a system provides a template list, a user selects a template through a user interface, and the template indirectly selects a sensor. Thus, the system automatically selects a corresponding actuator on the selected sensor according to the template. Next, the system provides a sensor event list, from which the user selects a sensor event, and the system automatically selects an actuator action according to the selected event. For example, if the user selects a weather forecast template from a list, a sensor performing weather forecast is selected indirectly, and the system can automatically select a device capable of indicating a rainy day, for example, an umbrella equipped with a light emitting diode (LED) and a music box. Next, the user selects a character event from services in the weather forecast template, and then the system can automatically select an action of switching on the LED during a rainy day instead of an action of causing the music box to make a sound.

However, when the number of the sensors and the number of the actuators is large, the semi-automatic binding method requires a complicated procedure of the user binding each of the sensors to each of the actuators, and a lot of time has to be spent before the binding can be established. There may also be cases where binding cannot be established because the user, due to lack of knowledge, presses buttons of an unmatched sensor/actuator pair. In addition, when the semi-automatic binding method is used, the template has to be updated frequently; otherwise, binding is likely to fail. Additionally, the second operation manner of the first semi-automatic binding method causes technically inexperienced users to be unable or unwilling to operate the application software.

In view of the above, the current implementation method of automatic binding suffers from lack of versatility, and may incur incorrect binding when processing multiple sensors and actuators; the operation procedure of the manual binding is complicated; and when the number of the sensors and the number of the actuators is large, the operation procedure of the semi-automatic binding is complicated.

Therefore, there is a need for a method and a system of binding sensors and actuators automatically, which can take information such as a location and an application field into consideration, so that a newly introduced device can be bound without updating the binding rule frequently. Meanwhile, the method and the system of the present disclosure can reduce the operational burden on a user when a large number of sensors and actuators are to be bound.

BRIEF SUMMARY OF THE INVENTION

The present disclosure provides a method of binding sensors and actuators automatically, in which the method includes the steps of: acquiring event description data of a sensor to be bound; acquiring action description data of an actuator to be bound; and matching the event description data and the action description data to decide whether to bind the event and the action.

The present disclosure further provides a system of binding sensors and actuators automatically, in which the system includes a device database, a binding generator, and a binding rule database. The device database is configured to store data of sensors and actuators. The binding generator is configured to compare the data of the sensors and the actuators to generate binding rules between the sensors and the actuators automatically. The binding rule database is configured to store the binding rules between the sensors and the actuators.

The technical features of the present disclosure have been described briefly in the summary above, so as to make the detailed description below more comprehensible. Other technical features that form the subject matters of the claims of the present disclosure are described below. It should be understood by persons of ordinary skill in the art of the present disclosure that the same objective as that of the present disclosure can be achieved by easily making modifications or designing other structures or processes based on the concepts and specific embodiments described below. It should also be understood by persons of ordinary skill in the art of the present disclosure that such equivalent constructions do not depart from the spirit and scope of the present disclosure defined by the appended claims.

BRIEF DESCRIPTION OF THE SEVERAL VIEWS OF THE DRAWINGS

FIG. 11 is a schematic view of binding rules of a plurality of sensors and actuators according to an embodiment of the present disclosure;

DETAILED DESCRIPTION OF THE INVENTION

The present disclosure is directed to a method and a system of binding sensors and actuators automatically. In order to thoroughly understand the present disclosure, detailed steps and constituents are described in the following description. Obviously, implementation of the present disclosure is not limited to special details known to persons skilled in the art of the present disclosure. In addition, well-known constituents or steps are not described in detail, so as to prevent the present disclosure from being limited unnecessarily. Preferred embodiments of the present disclosure are described in detail below. However, in addition to the detailed description, the present disclosure may also be widely implemented in other embodiments. Accordingly, the scope of the present disclosure is not limited to the detailed description, and is defined by the claims.

Figure 1:
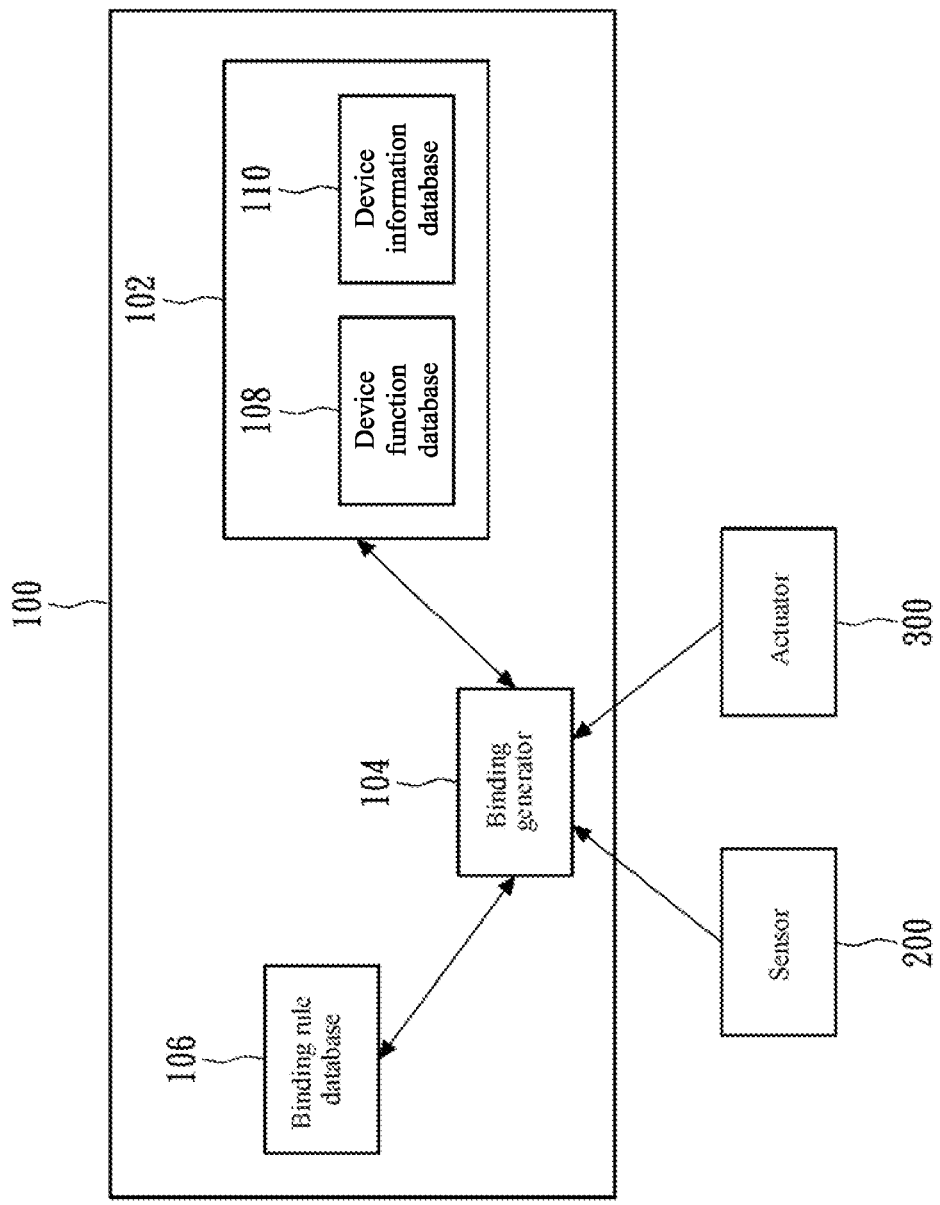
FIG. 1 is a schematic view of a system of binding sensors and actuators automatically according to an embodiment of the present disclosure.

FIG. 1 is a schematic view of a system of automatically binding sensors and actuators according to an embodiment of the present disclosure. As shown in FIG. 1, a system 100 includes an device database 102, a binding generator 104, and a binding rule database 106. The device database 102 is configured to store data of sensors and actuators. The binding generator 104 is configured to compare the data of the sensors and the actuators, and to generate binding rules between the sensors and the actuators automatically. The binding rule database 106 is configured to store the binding rules between the sensors and the actuators. The system 100 can communicate with a sensor 200 and an actuator 300 through a sensor network. The sensor 200 includes an identifier, and has one or more pieces of event description data. Each piece of event description data includes parameters such as an application field, a measurement field, context information, and event filters. The actuator 300 also includes an identifier, and has one or more pieces of action description data. Each piece of action description data includes parameters such as an application field, a measurement field, context information, and action parameters. Preferably, the device database 102 includes a device function database 108 and a device information database 110. The device function database 108 is configured to store the event description data of the sensors and the action description data of the actuators. The device information database 110 is configured to store identifiers and location information of the sensors and the actuators. The binding generator 104 compares the event description data of the sensor 200 and the action description data of the actuator 300, so as to generate a binding rule between the sensor 200 and the actuator 300 automatically. Preferably, the device database 102 additionally stores preset event filters and action parameters. This facilitates the setting of the event filters and the action parameters in the event description data of a sensor to be bound and the action description data of an actuator to be bound.

It should be noted that the sensor 200 and the actuator 300 shown in FIG. 1 may be bound to the sensor network in a wired or wireless manner. In addition, the sensor 200 and the actuator 300 may correspond to the same device or different devices. Furthermore, the sensor 200 may have a plurality of pieces of event description data, and the actuator 300 may also include a plurality of pieces of action description data.

In the embodiment of the present disclosure, each sensor or actuator has a property list. An identifier in the list uniquely indicates a sensor or an actuator. Type information in the list indicates a specific type to which the sensor or actuator belongs. Location information in the list indicates a location of the sensor or actuator. As shown in the following table, Table 1 is an implementation example of property lists of a temperature sensor, an illumination sensor, a passive infrared sensor, and a smoke detector. Table 2 is an implementation example of property lists of an alarm, a lamp, and an air conditioner.

TABLE 1

| Identifier | 00137A00000006CF, 0C |
|---|---|
| Type | Temperature |
| Location | Kitchen |
| Identifier | 00137A00000006BF, 0C |
| Type | Illumination |
| Location | Corridor |
| Identifier | 00137A00000006AF, 0C |

TABLE 1-continued

| Type | Human body detection |
|---|---|
| Location | Corridor |
| Identifier | 00137A000000069F, 0A |
| Type | Smoke detection |
| Location | Corridor |

TABLE 2

| Identifier | 00137A000000044F, 0A |
|---|---|
| Type | Alarm |
| Location | Living room |
| Identifier | 00137A000000045F, 0B |
| Type | Lamp |
| Location | Corridor |
| Identifier | 00137A000000046F, 0C |
| Type | Air conditioner |
| Location | Master bedroom |

In the embodiment of the present disclosure, each event description describes an event type of a sensor, and each event description may include multiple events. Each event includes an application field, a measurement field, a piece of context information, and multiple event filters. The application field is used to indicate a scenario to which the sensor is applicable, such as an application of comfort, an application of security, or an application of safety. The measurement field indicates a physical meaning thereof, such as temperature, relative humidity, or illumination. The items having no physical meaning in sensing and actuating behaviors may be ignored in the measurement field. The context information indicates a specific meaning in a specific application field. A simple classification method is to classify the context information into positive information and negative information. The event filter is used to describe an establish condition for an event, for example, human body movement, a temperature between 10° C. and 40° C., or an illumination lower than 500 lux. The event filter is an establish condition for a machine-recognizable event, and a description manner thereof is, for example, a measured value <0x01F4, which describes a condition that an illumination value is smaller than 500 lux.

Table 3 is an implementation example of a passive infrared sensor.

TABLE 3

| Event Item 1 | Action detection |
|---|---|
| Application Field | Security |
| Measurement Field | Irrelevant |
| Context Information | Negative |
| Event Filter | Zone status equals 0x0002 |
| Event Item 2 | Action detection |
| Application Field | Comfort |
| Measurement Field | Irrelevant |
| Context Information | Positive |
| Event Filter | Zone status equals 0x0002 |
| Event Item 3 | Action detection |
| Application Field | Security |
| Measurement Field | Irrelevant |
| Context Information | Positive |
| Event Filter | Zone status equals 0x0000 |
| Event Item 4 | Action detection |
| Application Field | Comfort |
| Measurement Field | Irrelevant |
| Context Information | Negative |
| Event Filter | Zone status equals 0x0000 |

Table 4 is an implementation example of a temperature sensor.

TABLE 4

| | |
|---|---|
| Event Item 1 | Comfort |
| Application Field | Comfort |
| Measurement Field | Temperature |
| Context Information | Positive |
| Event Filter | Not set |
| Event Item 2 | Discomfort |
| Application Field | Comfort |
| Measurement Field | Temperature |
| Context Information | Negative |
| Event Filter | Not set |

In the embodiment of the present disclosure, each action description describes an actuating type of an actuator, and each action description may include multiple actions. Each action includes an application field, a measurement field, a piece of context information, and multiple action parameters. The application field is used to indicate a scenario to which the actuator is applicable, such as an application of comfort, an application of security, or an application of safety. The measurement field indicates a physical meaning thereof, such as temperature, relative humidity, or illumination. The items having no physical meaning in sensing and actuating behaviors may be ignored in the measurement field. The context information indicates a specific meaning in a specific application field. A simple classification method is to classify the context information into positive information and negative information. The action parameter is used to describe details of performing an action, for example, making a doorbell sound, adjusting a temperature between 10° C. and 40° C., or adjusting an illumination to 500 lux. The action parameter refers to the details of a machine-recognizable action, and a description manner thereof is, for example, "Doorbell," which describes making a doorbell sound.

Table 5 is an implementation example of an alarm.

TABLE 5

| | |
|---|---|
| Action Item 1 | Silent |
| Application Field | Safety |
| Measurement Field | Irrelevant |
| Context Information | Positive |
| Action Parameter | Stop an action |
| Action Item 2 | Silent |
| Application Field | Security |
| Measurement Field | Irrelevant |
| Context Information | Positive |
| Action Parameter | Stop an action |
| Action Item 3 | Alarm |
| Application Field | Safety |
| Measurement Field | Irrelevant |
| Context Information | Negative |
| Action Parameter | Make an alarm sound |
| Action Item 4 | Alarm |
| Application Field | Security |
| Measurement Field | Irrelevant |
| Context Information | Negative |
| Action Parameter | Make an alarm sound |
| Action Item 5 | Doorbell |
| Application Field | Security |
| Measurement Field | Irrelevant |
| Context Information | Negative |
| Action Parameter | Make a doorbell sound |

Table 6 is an implementation example of an air conditioner.

TABLE 6

| | |
|---|---|
| Action Item 1 | Set a temperature |
| Application Field | Comfort |
| Measurement Field | Temperature |
| Context Information | Positive |

TABLE 6-continued

| | |
|---|---|
| Action Parameter | Not set |
| Action Item 2 | Set a temperature |
| Application Field | Comfort |
| Measurement Field | Temperature |
| Context Information | Negative |
| Action Parameter | Not set |

In the embodiment of the present disclosure, a binding rule includes fields such as binding rule identifier, sensor identifier, actuator identifier, event filters in the sensor type, and action parameters in the actuator type, as shown in Table 7.

TABLE 7

| Field | Quantity |
|---|---|
| Binding Rule Identifier | 1 |
| Event Filter List | 1 to u |
| Sensor Identifier | 1 |
| Event Filter | 1 |
| Action Parameter List | 1 to v |
| Actuator Identifier | 1 |
| Action Parameter | 1 |

An implementation example of a binding rule is shown in Table 8.

TABLE 8

| | |
|---|---|
| Identifier | Friday_4_June_2010_11_18_06 |
| Event Filter List | |
| Sensor Identifier 1 | 00137A00000006AF, 0A |
| Event Filter 1 | Detect an action |
| Action Parameter List | |
| Actuator Identifier 1 | 00137A000000044F, 0A |
| Action Parameter 1 | Silent |

Figure 2:
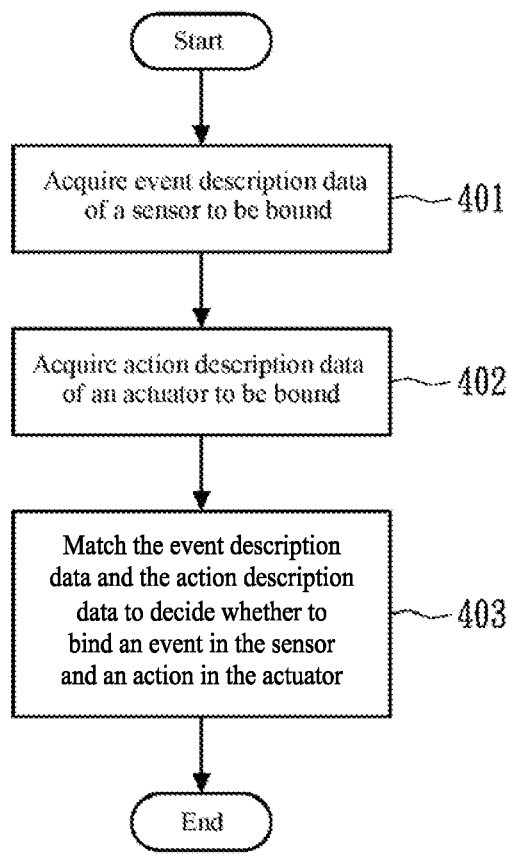
FIG. 2 is a flow chart of a method of binding sensors and actuators automatically according to an embodiment of the present disclosure.

FIG. 2 is a flow chart of a method of binding sensors and actuators automatically according to an embodiment of the present disclosure. In Step 401, event description data of a sensor to be bound is acquired, and the procedure proceeds to Step 402. In Step 402, action description data of an actuator to be bound is acquired, and the procedure proceeds to Step 403. In Step 403, the event description data and the action description data are compared to determine whether to bind the event and the action.

The following illustrates the application of the method of binding sensors and actuators automatically in FIG. 2 to the system 100 of binding sensors and actuators automatically in FIG. 1. In Steps 401 and 402, the system 100 acquires the event description data of the sensor 200 and the action description data of the actuator 300. In Step 403, the binding generator 104 compares the event description data and the action description data to determine whether to bind the event and the action.

As described above, in the implementation example of the present disclosure, the event description data includes parameters such as an application field, a measurement field, context information, and event filters, and the action description data includes parameters such as an application field, a measurement field, context information, and action parameters. Therefore, in Step 403, the binding generator 104 may perform a match according to the parameters and location information.

Figure 3:
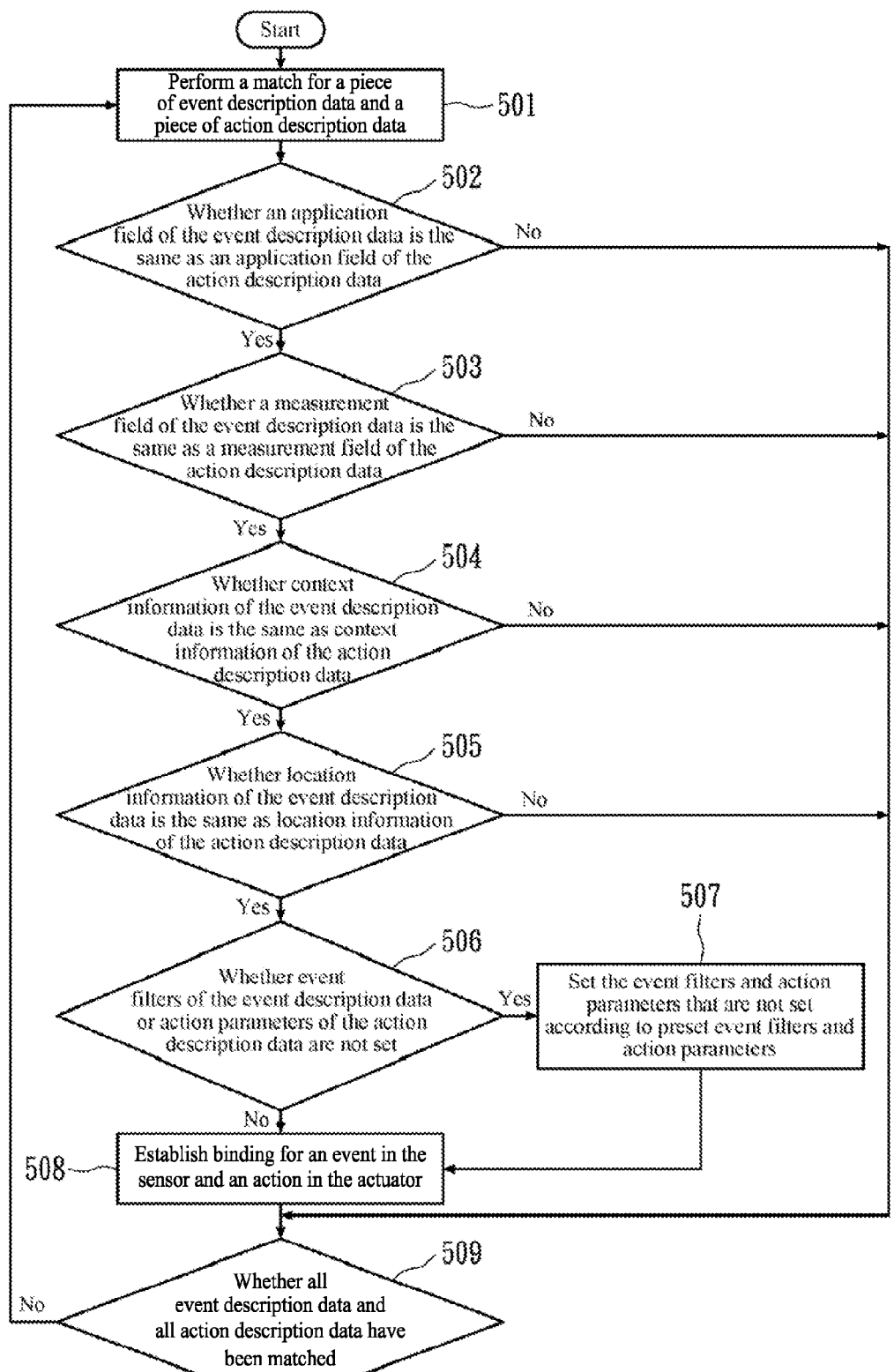
FIG. 3 is another flow chart of a method of binding sensors and actuators automatically according to an embodiment of the present disclosure.

FIG. 3 is a detailed flow chart of Step 403. In Step 501, a match is performed for a piece of event description data and a piece of action description data, and the procedure proceeds to Step 502. In Step 502, it is determined whether an application field of the event description data is the same as an application field of the action description data. If the application field of the event description data is determined to be the same as the application field of the action description data, the procedure proceeds to Step 503; otherwise, the procedure proceeds to Step 509. In Step 503, it is determined whether a measurement field of the event description data is the same as a measurement field of the action description data. If the measurement field of the event description data is determined to be the same as the measurement field of the action description data, the procedure proceeds to Step 504; otherwise, the procedure proceeds to Step 509. In Step 504, it is determined whether context information of the event description data is the same as context information of the action description data. If the context information of the event description data is determined to be the same as the context information of the action description data, the procedure proceeds to Step 505; otherwise, the procedure proceeds to Step 509. In Step 505, it is determined whether location information of a sensor corresponding to the event description data is the same as location information of an actuator corresponding to the action description data. If the location information of the sensor corresponding to the event description data is determined to be the same as the location information of the actuator corresponding to the action description data, the procedure proceeds to Step 506; otherwise, the procedure proceeds to Step 509. In Step 506, it is determined whether event filters of the event description data or action parameters of the action description data are not set. If the event filters of the event description data or action parameters of the action description data are determined to be not set, the procedure proceeds to Step 507; otherwise, the procedure proceeds to Step 508. In Step 507, the event filters and action parameters that are not set are set according to preset event filters and action parameters, and the procedure proceeds to Step 508. In Step 508, binding is established for the event description data and the action description data, and the procedure proceeds to Step 509. In Step 509, it is determined whether all event description data and all action description data have been compared. If yes, the procedure ends; otherwise, the procedure returns to Step 501 to perform a match for a next piece of event description data or action description data. However, the step determining the setting status of the event filters of the event description data or the action parameters of the action description data could be executed prior to the application field comparison or follow the context information comparison. In an embodiment of the present invention, FIG. 3 demonstrates the latter condition.

In the method according to FIG. 2 and FIG. 3, if the sensor 200 is a lamp switch, in the event description data of the lamp switch, an application field is comfort, a measurement field is illumination, positive context information is turn on, negative context information is turn off, and location information of the sensor 200 is living room. Accordingly, the respective actuator 300 is a lamp; in the action description data of the lamp, an application field is comfort, a measurement field is illumination, positive context information is turn on, negative context information is turn off, and location information of the actuator 300 is living room; and the binding generator 104 may generate the following binding rule: if the lamp switch 200 is moved to an on position, the lamp 300 turns on; if the lamp switch 200 is moved to an off position, the lamp 300 turns off.

Referring to the method of FIG. 3, as shown in the aforementioned lists, the measurement field of some event description data or some action description data may not be applicable. In this case, the procedure may skip Step 503 and proceed to Step 504 directly. On the other hand, the context information and the event filters of some event description data, or the context information and the action parameters of some action description data, may be not set. In this case, as shown in Step 507, the event filters and action parameters that are not set may be set according to the preset event filters and action parameters pre-stored in the device database 102. For example, if the sensor 200 is an illumination sensor, in the event description data of the illumination sensor, an application field is comfort, a measurement field is illumination, event filters are not set, and location information of the sensor 200 is living room. Accordingly, the respective actuator 300 is a lamp; in the action description data of the lamp, an application field is comfort, a measurement field is illumination, positive context information is turn on, negative context information is turn off; and location information of the actuator 300 is living room. Accordingly, the binding generator 104 may generate the following binding rule: if an illumination detected by the illumination sensor 200 is less than 500 lux, the lamp 300 turns on; and if the illumination detected by the illumination sensor 200 is greater than or equal to 500 lux, the lamp 300 turns off. The parameter of 500 lux is acquired from the device database 102.

Figure 4:
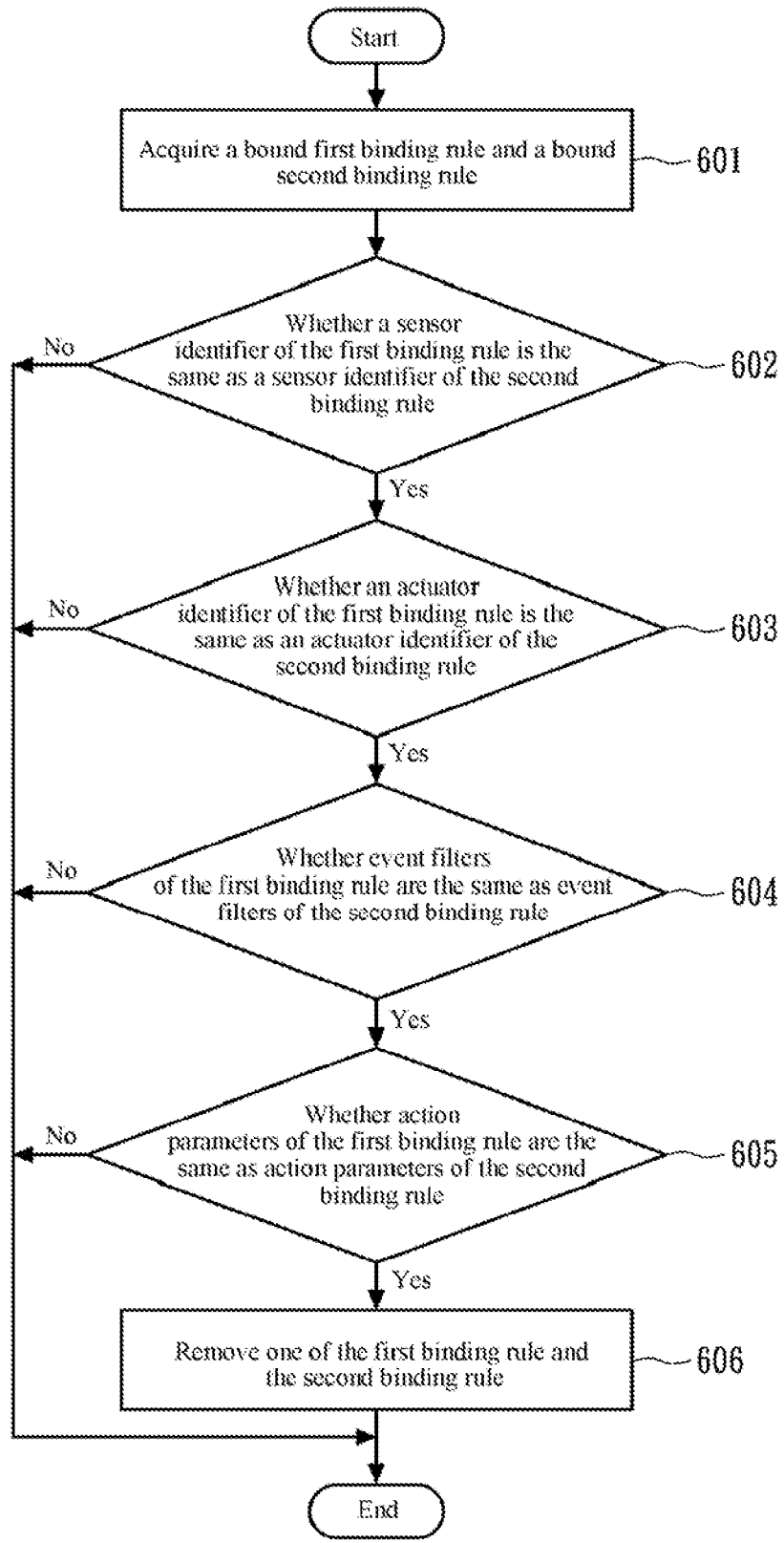
FIG. 4 is a schematic view of a method of merging binding rules according to an embodiment of the present disclosure.

During binding, different sensors may be bound to the same actuator, or the same sensor may be bound to different actuators. In this case, the binding rules may be merged. FIG. 4 is a schematic view of a method of merging binding rules according to an embodiment of the present disclosure. In Step 601, a bound first binding rule and a bound second binding rule are acquired, and the procedure proceeds to Step 602. In Step 602, it is determined whether a sensor identifier of the first binding rule is the same as a sensor identifier of the second binding rule. If the sensor identifier of the first binding rule is determined to be the same as the sensor identifier of the second binding rule, the procedure proceeds to Step 603; otherwise, the procedure ends. In Step 603, it is determined whether an actuator identifier of the first binding rule is the same as an actuator identifier of the second binding rule. If the actuator identifier of the first binding rule is determined to be the same as the actuator identifier of the second binding rule, the procedure proceeds to Step 604; otherwise, the procedure ends. In Step 604, it is determined whether event filters of the first binding rule are the same as event filters of the second binding rule. If the event filters of the first binding rule are determined to be the same as the event filters of the second binding rule, the procedure proceeds to Step 605; otherwise, the procedure ends. In Step 605, it is determined whether action parameters of the first binding rule are the same as action parameters of the second binding rule. If the action parameters of the first binding rule are determined to be the same as the action parameters of the second binding rule, the procedure proceeds to Step 606; otherwise, the procedure ends. In Step 606, either the first binding rule or the second binding rule is removed, and the procedure ends.

Figure 5:
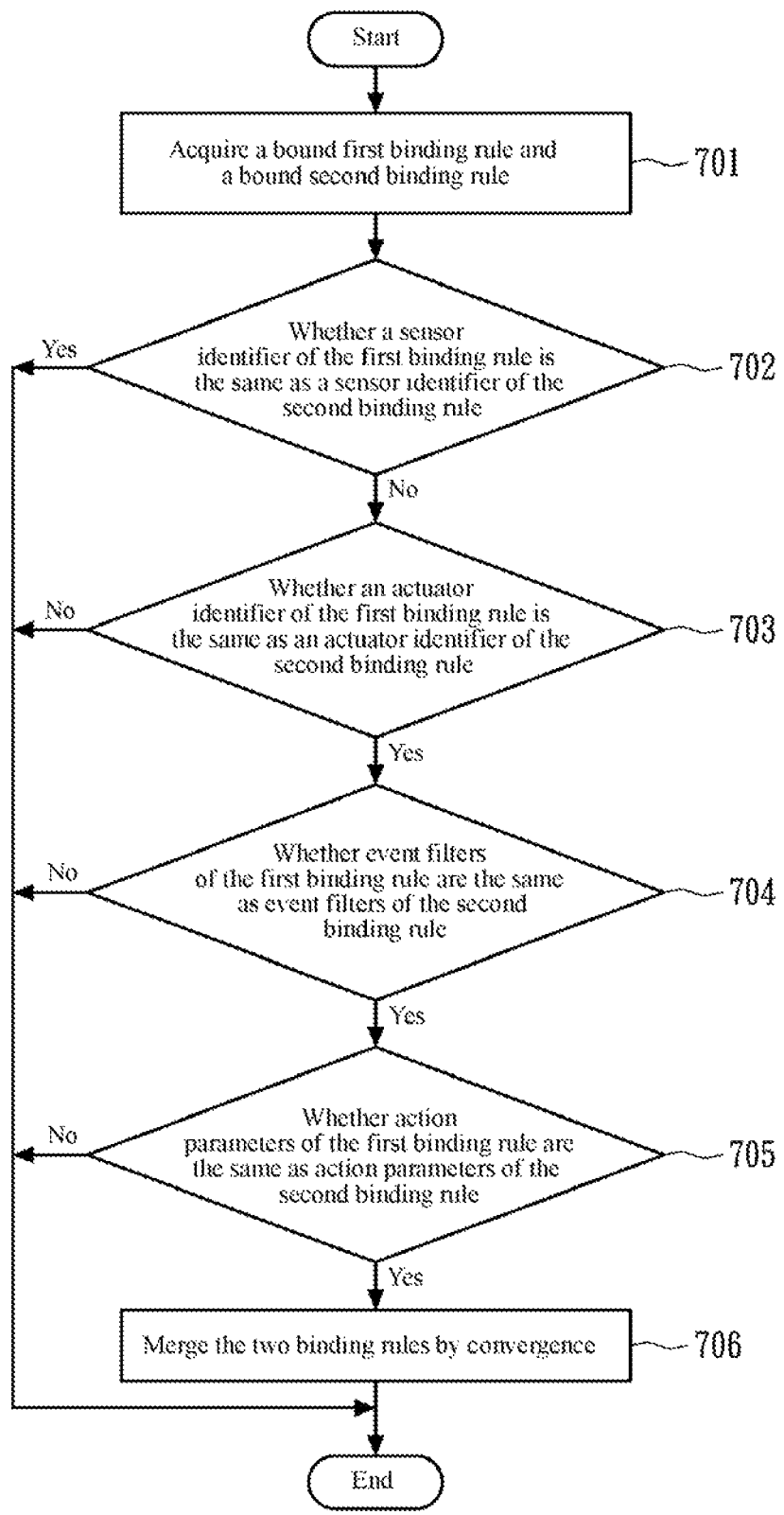
FIG. 5 is a schematic view of a method of merging binding rules according to another embodiment of the present disclosure.

FIG. 5 is a schematic view of a method of merging binding rules according to another embodiment of the present disclosure. In Step 701, a bound first binding rule and a bound second binding rule are acquired, and the procedure proceeds to Step 702. In Step 702, it is determined whether a sensor identifier of the first binding rule is the same as a sensor identifier of the second binding rule. If the sensor identifier of the first binding rule is determined to be not the same as the sensor identifier of the second binding rule, the procedure proceeds to Step 703; otherwise, the procedure ends. In Step 703, it is determined whether an actuator identifier of the first binding rule is the same as an actuator identifier of the second binding rule. If the actuator identifier of the first binding rule is determined to be the same as the actuator identifier of the second binding rule, the procedure proceeds to Step 704; otherwise, the procedure ends. In Step 704, it is determined whether event filters of the first binding rule are the same as event filters of the second binding rule. If the event filters of the first binding rule are determined to be the same as the event filters of the second binding rule, the procedure proceeds to Step 705; otherwise, the procedure ends. In Step 705, it is determined whether action parameters of the first binding rule are the same as action parameters of the second binding rule. If the action parameters of the first binding rule are determined to be the same as the action parameters of the second binding rule, the procedure proceeds to Step 706; otherwise, the procedure ends. In Step 706, the two binding rules are merged by convergence, and the procedure ends.

Figure 6:
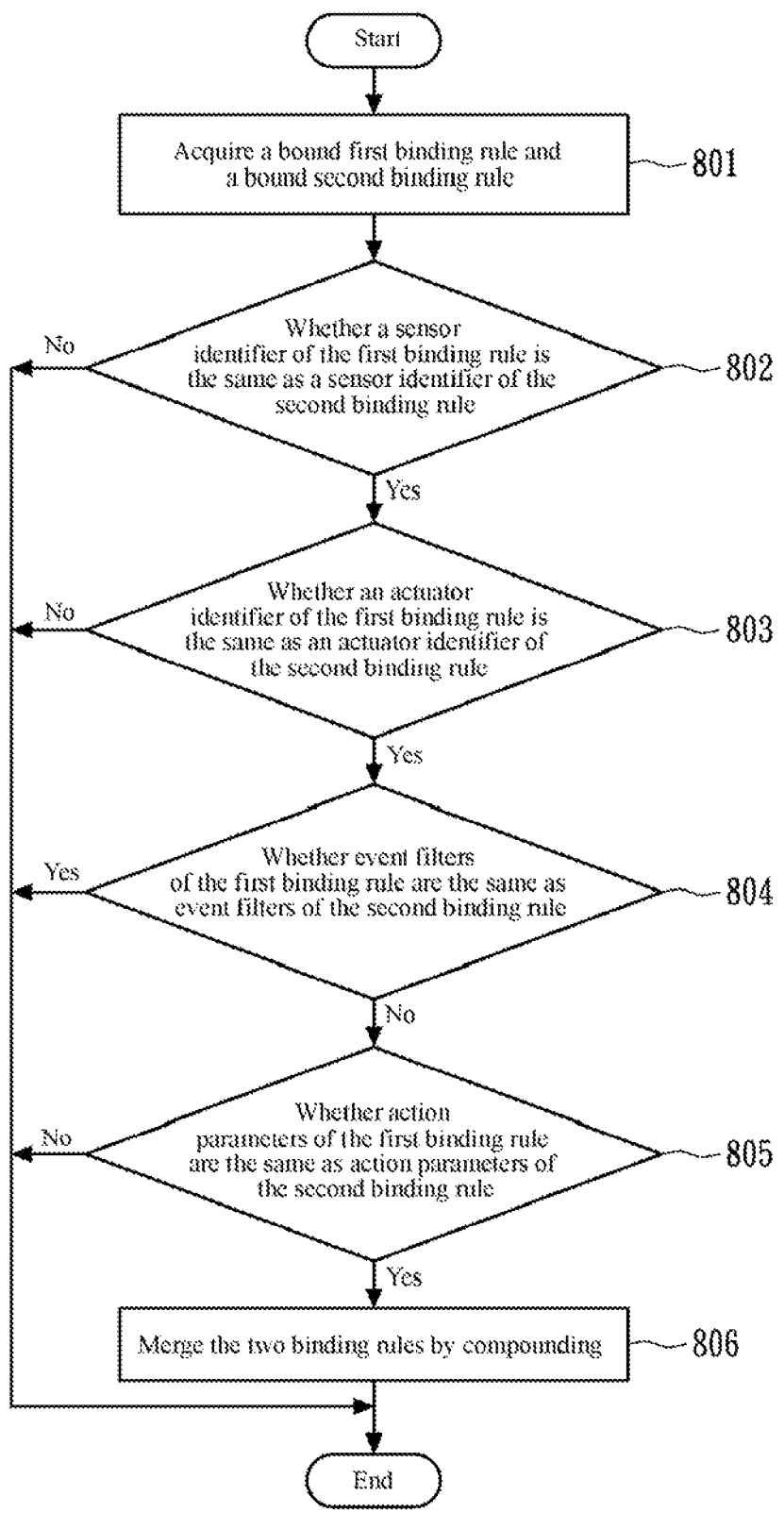
FIG. 6 is a schematic view of a method of merging binding rules according to another embodiment of the present disclosure.

FIG. 6 is a schematic view of a method of merging binding rules according to another embodiment of the present disclosure. In Step 801, a bound first binding rule and a bound second binding rule are acquired, and the procedure proceeds to Step 802. In Step 802, it is determined whether a sensor identifier of the first binding rule is the same as a sensor identifier of the second binding rule. If the sensor identifier of the first binding rule is determined to be the same as the sensor identifier of the second binding rule, the procedure proceeds to Step 803; otherwise, the procedure ends. In Step 803, it is determined whether an actuator identifier of the first binding rule is the same as an actuator identifier of the second binding rule. If the actuator identifier of the first binding rule is determined to be the same as the actuator identifier of the second binding rule, the procedure proceeds to Step 804; otherwise, the procedure ends. In Step 804, it is determined whether event filters of the first binding rule are the same as event filters of the second binding rule. If the event filters of the first binding rule are determined to be not the same as the event filters of the second binding rule, the procedure proceeds to Step 805; otherwise, the procedure ends. In Step 805, it is determined whether action parameters of the first binding rule are the same as action parameters of the second binding rule. If the action parameters of the first binding rule are determined to be the same as the action parameters of the second binding rule, the procedure proceeds to Step 806; otherwise, the procedure ends. In Step 806, the two binding rules are merged by compounding, and the procedure ends.

Figure 7:
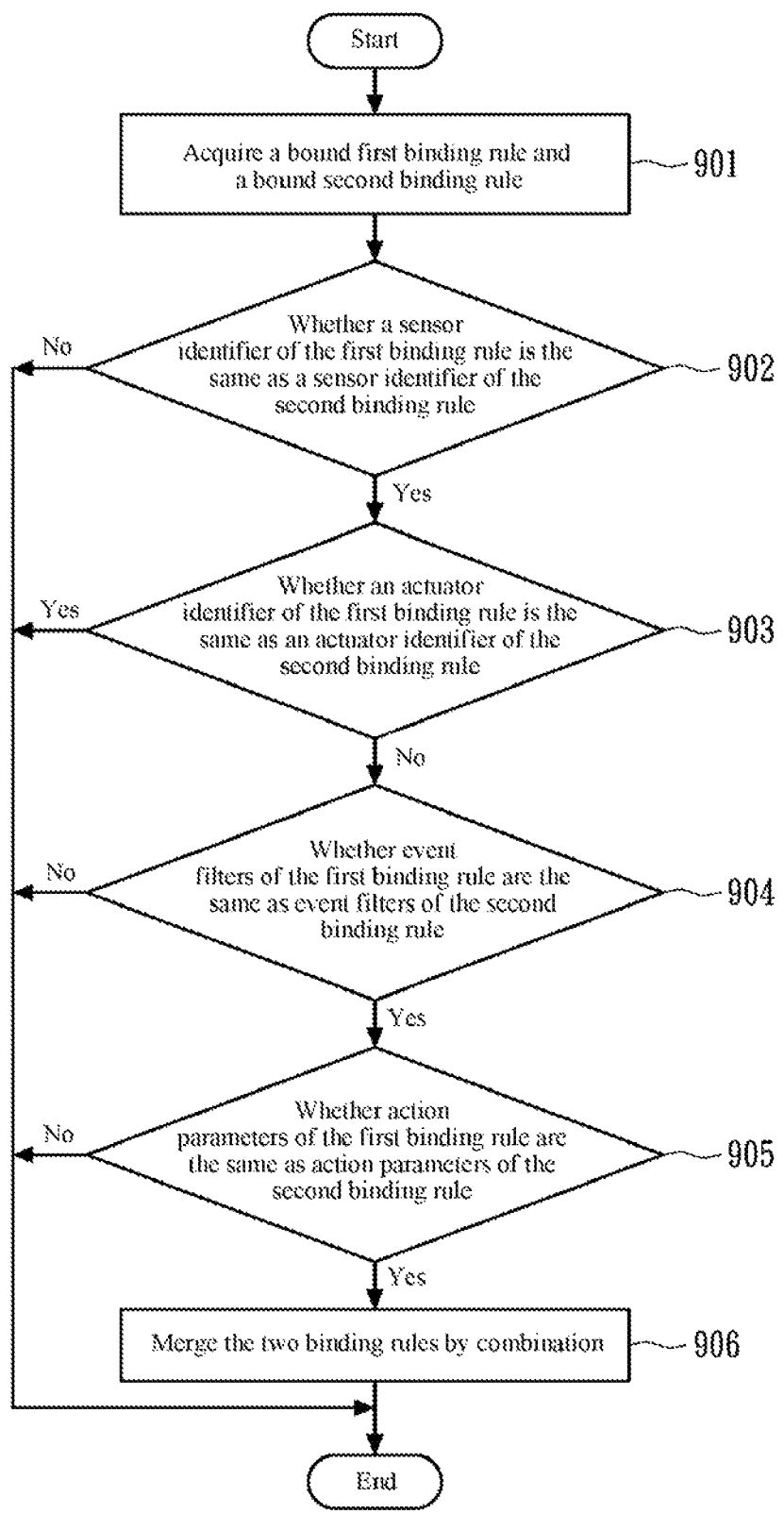
FIG. 7 is a schematic view of a method of merging binding rules according to another embodiment of the present disclosure.

FIG. 7 is a schematic view of a method of merging binding rules according to another embodiment of the present disclosure. In Step 901, a bound first binding rule and a bound second binding rule are acquired, and the procedure proceeds to Step 902. In Step 902, it is determined whether a sensor identifier of the first binding rule is the same as a sensor identifier of the second binding rule. If the sensor identifier of the first binding rule is determined to be the same as the sensor identifier of the second binding rule, the procedure proceeds to Step 903; otherwise, the procedure ends. In Step 903, it is determined whether an actuator identifier of the first binding rule is the same as an actuator identifier of the second binding rule. If the actuator identifier of the first binding rule is determined to be not the same as the actuator identifier of the second binding rule, the procedure proceeds to Step 904; otherwise, the procedure ends. In Step 904, it is determined whether event filters of the first binding rule are the same as event filters of the second binding rule. If the event filters of the first binding rule are determined to be the same as the event filters of the second binding rule, the procedure proceeds to Step 905; otherwise, the procedure ends. In Step 905, it is determined whether action parameters of the first binding rule are the same as action parameters of the second binding rule. If the action parameters of the first binding rule are determined to be the same as the action parameters of the second binding rule, the procedure proceeds to Step 906; otherwise, the procedure ends. In Step 906, the two binding rules are merged by combination, and the procedure ends.

Figure 8:
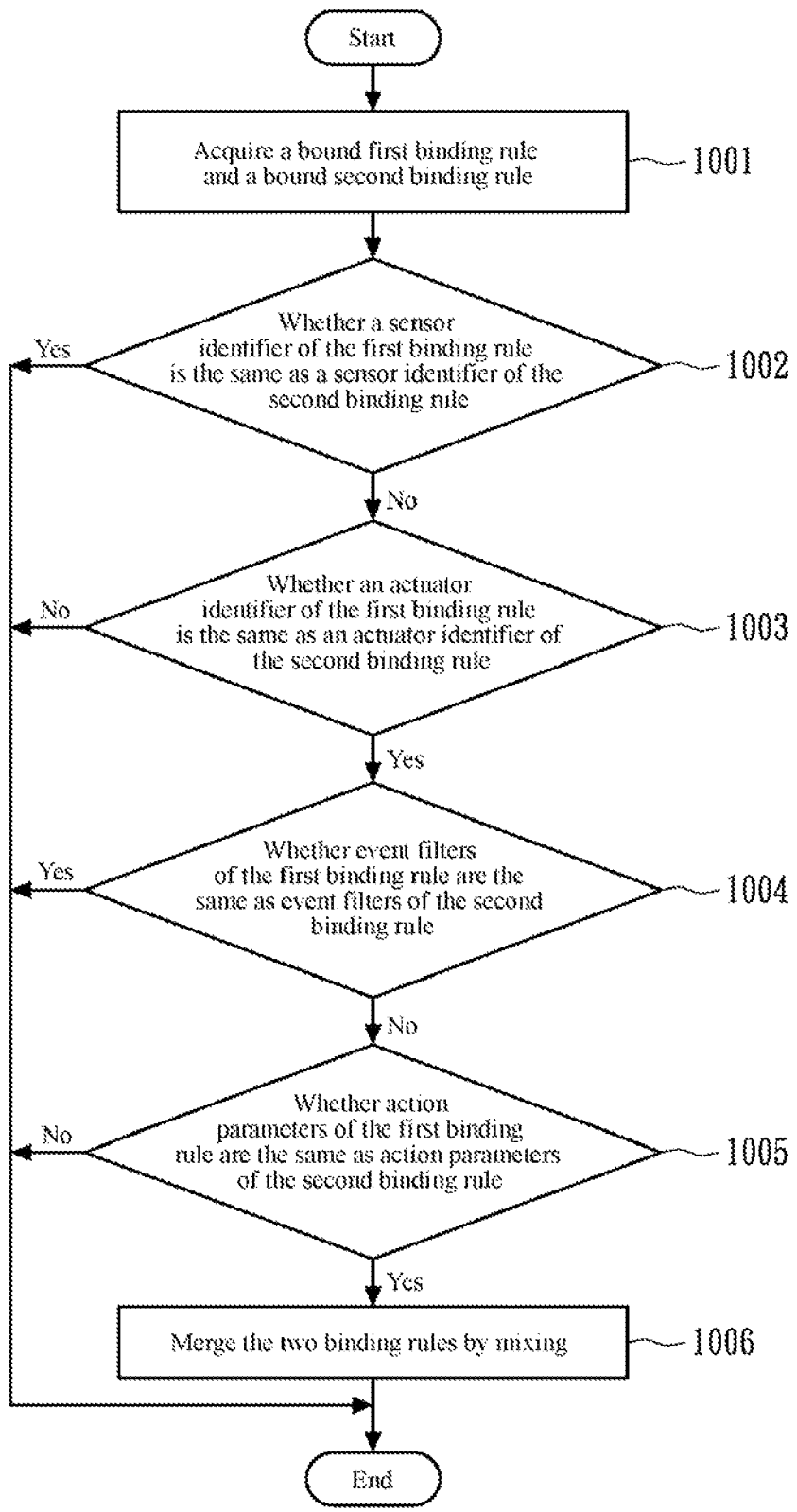
FIG. 8 is a schematic view of a method of merging binding rules according to another embodiment of the present disclosure.

FIG. 8 is a schematic view of a method of merging binding rules according to another embodiment of the present disclosure. In Step 1001, a bound first binding rule and a bound second binding rule are acquired, and the procedure proceeds to Step 1002. In Step 1002, it is determined whether a sensor identifier of the first binding rule is the same as a sensor identifier of the second binding rule. If the sensor identifier of the first binding rule is determined to be not the same as the sensor identifier of the second binding rule, the procedure proceeds to Step 1003; otherwise, the procedure ends. In Step 1003, it is determined whether an actuator identifier of the first binding rule is the same as an actuator identifier of the second binding rule. If the actuator identifier of the first binding rule is determined to be the same as the actuator identifier of the second binding rule, the procedure proceeds to Step 1004; otherwise, the procedure ends. In Step 1004, it is determined whether event filters of the first binding rule are the same as event filters of the second binding rule. If the event filters of the first binding rule are determined to be not the same as the event filters of the second binding rule, the procedure proceeds to Step 1005; otherwise, the procedure ends. In Step 1005, it is determined whether action parameters of the first binding rule are the same as action parameters of the second binding rule. If the action parameters of the first binding rule are determined to be the same as the action parameters of the second binding rule, the procedure proceeds to Step 1006; otherwise, the procedure ends. In Step 1006, the two binding rules are merged by mixing, and the procedure ends.

When the binding rules are merged according to the methods of FIG. 4 to FIG. 8, logical operators of the binding rules for binding positive context data bind negative context data according to De Morgan's Law. For example, if the positive context data of the binding rules is merged through an "OR" operator, the negative context of the binding rules may be merged through an "AND" operator. For example, one binding rule states, "if an motion detector detects an action, a lamp is detect open; if the motion detector does not detect any action, the lamp is turned off," and another binding rule states, "if an illumination is lower than a preset value, a lamp is turned on; if the illumination is higher than or equal to a preset value, the lamp is turned off." Such two binding rules may be merged according to the method of mixing a sensor and an event of FIG. 8 as follows: if an motion detector detects an action, and an illumination is lower than a preset value, a lamp is turned on; if the motion detector does not detect any action, or if the illumination is greater than or equal to a preset value, the lamp is turned off.

During binding, event description data of the same sensor may be bound to different action description data of the same actuator. In this case, the conflict may be solved through an external variable. For example, one binding rule states, "if a contact switch is detect close, an alarm is silent; if the contact switch is detect open, the alarm makes an alarm sound," and another binding rule states, "if a contact switch is detect close, an alarm is silent; if the contact switch is detect open, the alarm makes a doorbell sound." Such two binding rules conflict with each other. In this case, an external variable may be introduced to solve the conflict. After an external variable is added, the new binding rule may state, "if a switch is detect close, an alarm is silent; if the contact switch is detect open, and a state is 0, then the alarm makes an alarm sound; if the contact switch is detect open, and the state is 1, then the alarm makes a doorbell sound."

Figure 9:
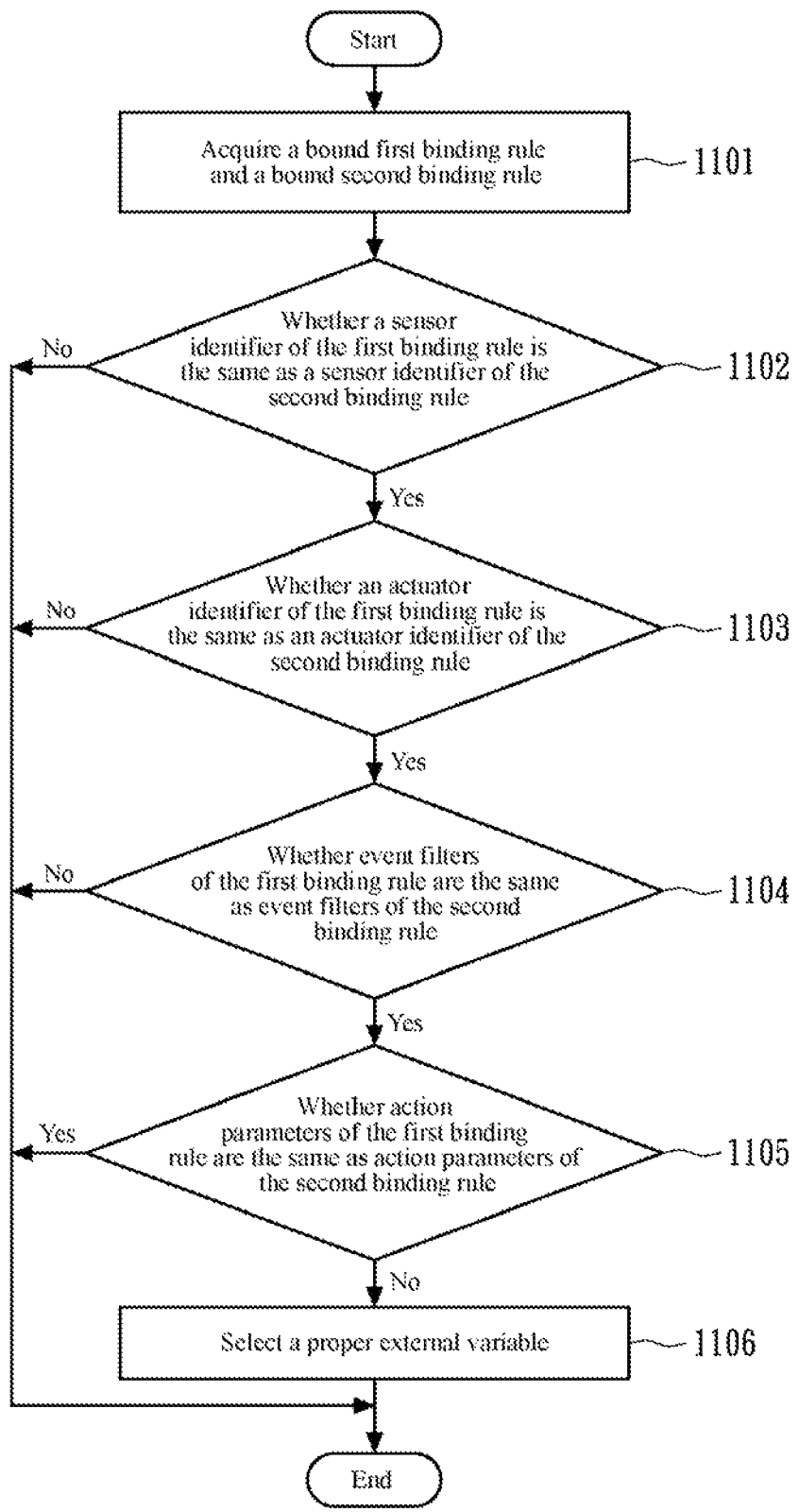
FIG. 9 is a flow chart of a method of introducing an external variable according to an embodiment of the present disclosure.

FIG. 9 is a flow chart of a method of introducing an external variable according to an embodiment of the present disclosure. In Step 1101, a bound first binding rule and a bound second binding rule are acquired, and the procedure proceeds to Step 1102. In Step 1102, it is determined whether a sensor identifier of the first binding rule is the same as a sensor identifier of the second binding rule. If the sensor identifier of the first binding rule is determined to be the same as the sensor identifier of the second binding rule, the procedure proceeds to Step 1103; otherwise, the procedure ends. In Step 1103, it is determined whether an actuator identifier of the first binding rule is the same as an actuator identifier of the second binding rule. If the actuator identifier of the first binding rule is determined to be the same as the actuator identifier of the second binding rule, the procedure proceeds to Step 1104; otherwise, the procedure ends. In Step 1104, it is determined whether event filters of the first binding rule are the same as event filters of the second binding rule. If the event filters of the first binding rule are determined to be the same as the event filters of the second binding rule, the procedure proceeds to Step 1105; otherwise, the procedure ends. In Step 1105, it is determined whether action parameters of the first binding rule are the same as action parameters of the second binding rule. If the action parameters of the first binding rule are determined to be not the same as the action parameters of the second binding rule, the procedure proceeds to Step 1106; otherwise, the procedure ends. In Step 1106, a proper external variable is selected, and the procedure ends.

Figure 10:
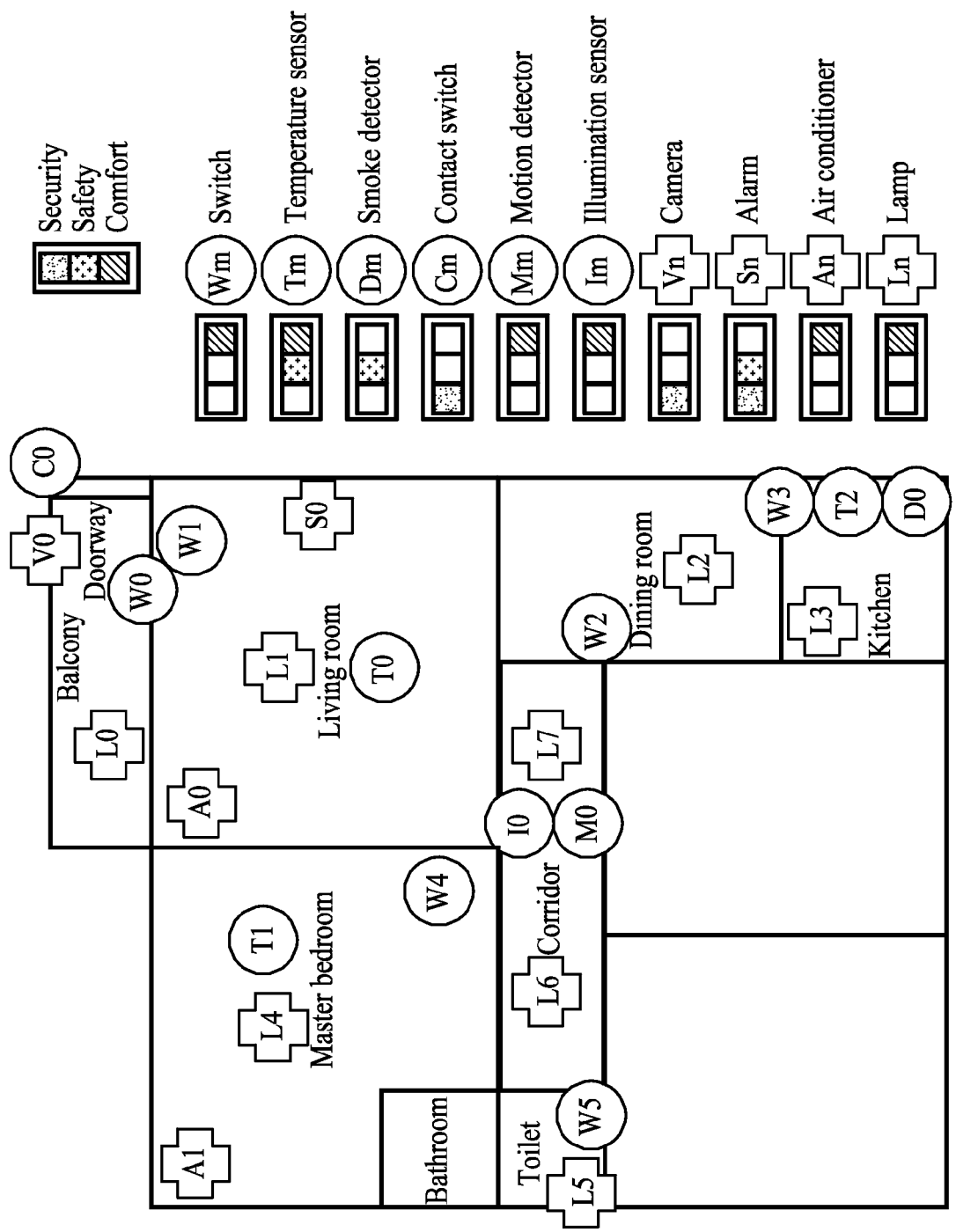
FIG. 10 is a plane view of a deployment of a plurality of sensors and actuators according to an embodiment of the present disclosure.

An implementation example in which the method and the system of binding sensors and actuators automatically of the present disclosure are used to bind a plurality of sensors and actuators is illustrated below. FIG. 10 is a plane view of a deployment of a plurality of sensors and actuators according to an embodiment of the present disclosure. As shown in FIG. 10, each sensor and actuator belongs to one or more application fields. For example, a temperature sensor belongs to application fields of safety and comfort, a contact switch belongs to an application field of security, an alarm belongs to application fields of security and safety, and a camera belongs to an application field of security.

FIG. 11 is a schematic view of completing binding rules of a plurality of sensors and actuators of FIG. 10 according to the method and system of binding sensors and actuators automatically of the present disclosure. As shown in FIG. 11, each grid represents a pair of binding rules (including a positive binding rule and a negative binding rule). For each of the binding rules, the first letter indicates a sensor type, the first number indicates a sensor identifier, the second letter E indicates an event, the third letter p or n indicates an event context (p indicates positive and n indicates negative), the fourth letter indicates an actuator type, the second number indicates an actuator identifier, the fifth letter A indicates an action, and the sixth letter p or n indicates an action context (p indicates positive and n indicates negative). The sensor event is separated from the actuator action by a colon. For example, a first grid "W0Ep:L0Ap" indicates binding of a positive event of a $0^{th}$ switch and a positive action of a $0^{th}$ lamp.

Figure 12:
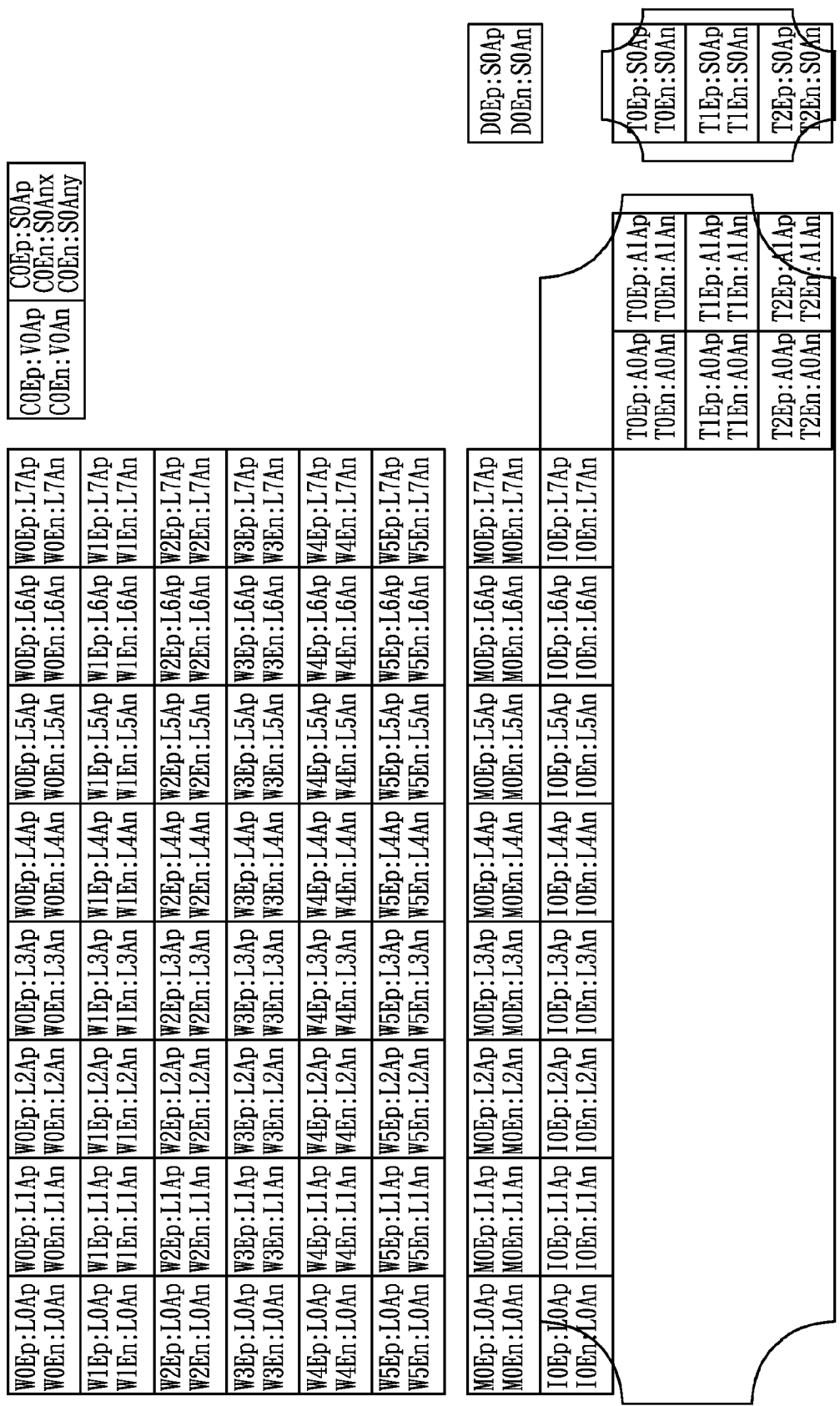
FIG. 12 is another schematic view of binding rules of a plurality of sensors and actuators according to an embodiment of the present disclosure.

As shown in FIG. 11, a temperature sensor and an air conditioner do not have a preset threshold value. Therefore, event filters and action parameters that are not set may be set according to preset event filters and action parameters pre-stored in a device database; for example, a threshold value of an event is added. FIG. 12 is a schematic view of correcting binding rules of a plurality of sensors and actuators of FIG. 11 according to the method and system of binding sensors and actuators automatically of the present disclosure.

Figure 13:
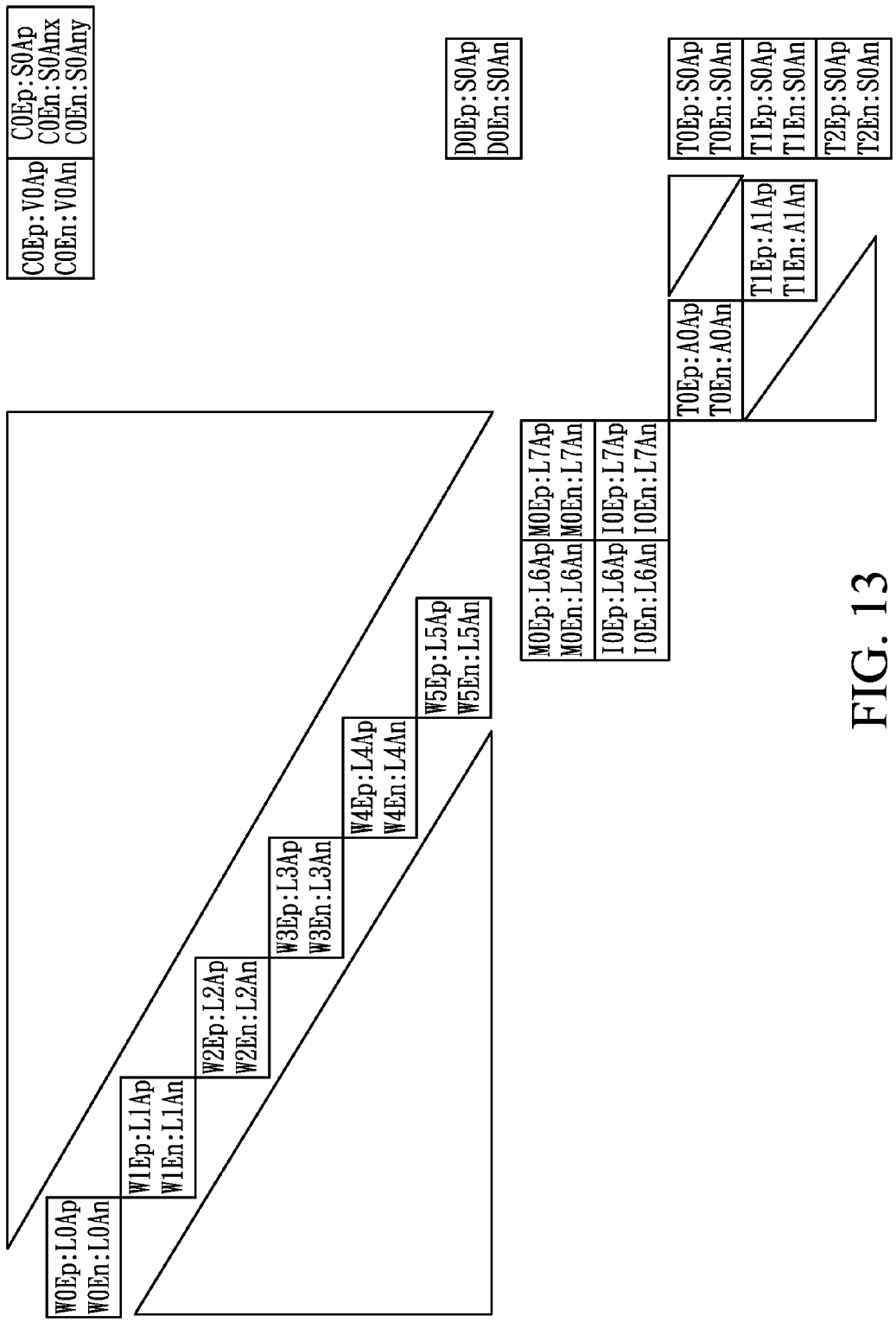
FIG. 13 is another schematic view of binding rules of a plurality of sensors and actuators according to an embodiment of the present disclosure.

As shown in FIG. 12, some binding rules are not reasonable. For example, a binding rule might state a $0^{th}$ switch is bound to a $1^{st}$ lamp. Therefore, the schematic view of binding rules of a plurality of sensors and actuators in FIG. 12 may further be corrected by referring to location information of the sensors and actuators. FIG. 13 is a schematic view of correcting binding rules of a plurality of sensors and actuators shown in FIG. 12 according to the method and system of binding sensors and actuators automatically of the present disclosure.

Figure 14:
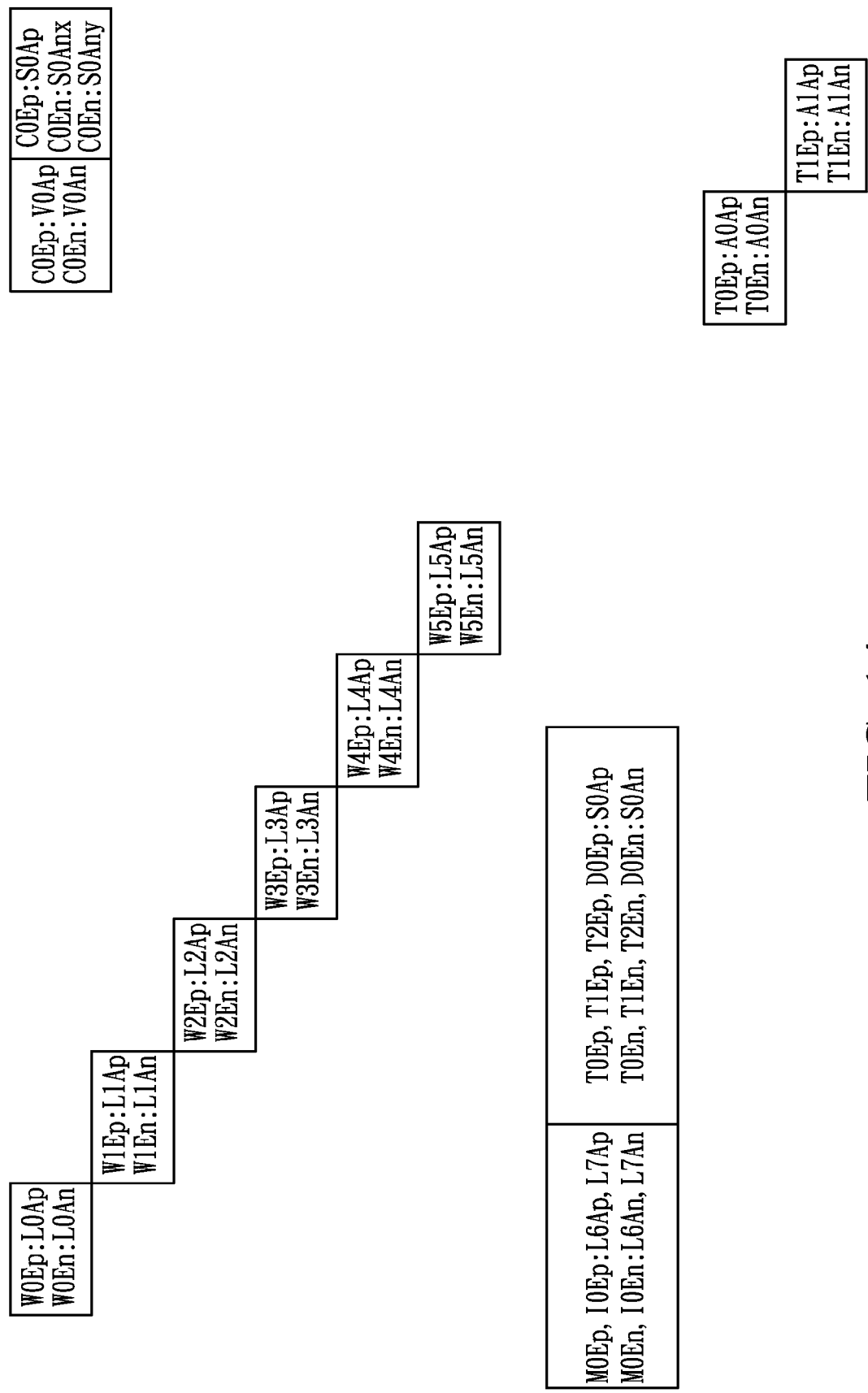
FIG. 14 is another schematic view of binding rules of a plurality of sensors and actuators according to an embodiment of the present disclosure.

As shown in FIG. 13, some binding rules may further be simplified by merging. For example, merging multiple binding rules that are related to temperatures of temperature sensors, wherein the temperatures are exceeding a threshold value; or merging a binding rule that is related to a passive infrared sensor, wherein the infrared sensor is detecting human body movement, to another binding rule that is related to illumination of an illumination sensor, wherein the illumination is lower than a threshold value. FIG. 14 is a schematic view of correcting binding rules of a plurality of sensors and actuators of FIG. 13 according to the method and system of binding sensors and actuators automatically of the present disclosure.

Figure 15:
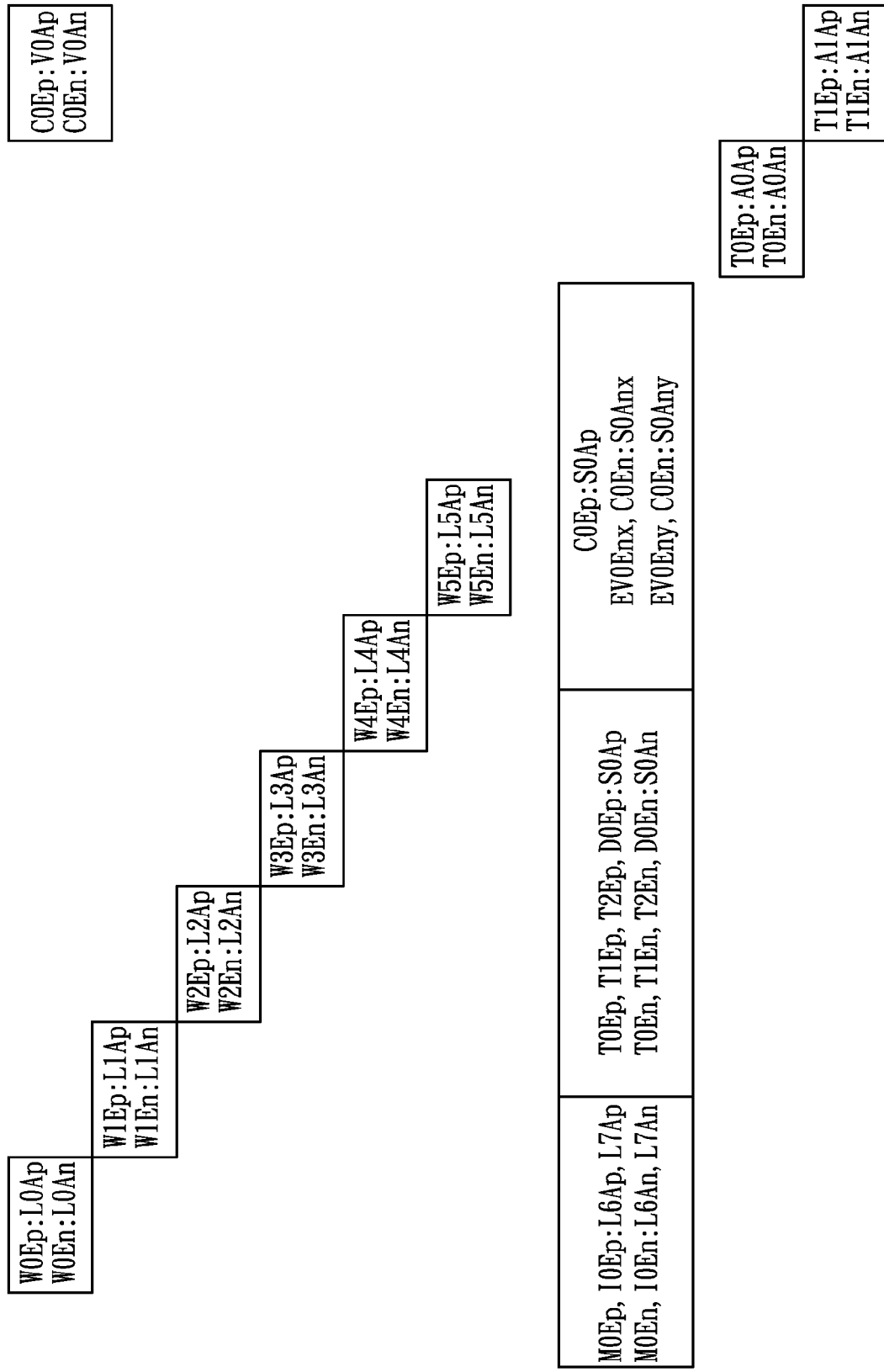
FIG. 15 is another schematic view of binding rules of a plurality of sensors and actuators according to an embodiment of the present disclosure.

As shown in FIG. 14, some binding rules are still unreasonable. For example, a conflict occurs because turning on of a contact switch causes an alarm to make not only an alarm sound but also a doorbell sound. Therefore, an external variable may be introduced to solve the conflict. FIG. 15 is a schematic view of correcting binding rules of a plurality of sensors and actuators shown in FIG. 14, according to the method of introducing an external variable in FIG. 14. As shown in FIG. 15, a user is only required to operate a value Enx or Eny of an external variable EV0 to enable one of the bindings without incurring any conflict.

In view of the above, the method and the system of binding sensors and actuators automatically provided by the present disclosure take information such as a location and an application field into consideration at the same time, so that a newly introduced device can be bound without updating binding rules frequently. Meanwhile, the method and the system of the present disclosure can reduce the operational burden on a user when a large number of sensors and actuators are to be bound.

Although the technical contents and features of the present disclosure are described above, various replacements and modifications can be made by persons skilled in the art based on the teachings and disclosure of the present disclosure without departing from the spirit thereof. Therefore, the scope of the present disclosure is not limited to the described embodiments, but covers various replacements and modifications that do not depart from the present disclosure as defined by the appended claims.

We claim:

1. A method of binding sensors and actuators automatically, comprising:
   acquiring event description data of a sensor to be bound;
   acquiring action description data of an actuator to be bound; and
   matching the event description data and the action description data in order to determine whether to bind an event in the sensor and an action in the actuator, the step of matching comprising:
   determining whether an application field of the event description data is the same as an application field of the action description data;

determining whether a measurement field of the event description data is the same as a measurement field of the action description data; and determining whether context information of the event description data is the same as context information of the action description data.

2. The method according to claim 1 further comprising:
setting event filters in the event description data and action parameters in the action description data according to preset event filters and preset action parameters if the event filters and the action parameters are not set, otherwise establishing binding for an event in the sensor and an action in the actuator.

3. The method according to claim 1, wherein the step of matching further comprises:
determining whether a location information of the event description data is the same as a location information of the action description data.

4. The method according to claim 1, further comprising:
matching a bound first binding rule and a bound second binding rule;
wherein merging the first binding rule and the second binding rule if all of the following conditions are met: (a) the sensor identifier of the first binding rule is the same as the sensor identifier of the second binding rule; (b) the actuator identifier of the first binding rule is not the same as an actuator identifier of the second binding rule; (c) the event filters of the first binding rule are the same as the event filters of the second binding rule; and (d) the action parameters of the first binding rule are the same as the action parameters of the second binding rule, otherwise the merging the first binding rule and the second binding rule ends.

5. The method according to claim 4, wherein the context information comprises positive information and negative information, and logical operators of the merged first binding rule and second binding rule for binding positive context data bind negative context data according to De Morgan's Law.

6. The method according to claim 1, further comprising:
matching a bound third binding rule and a bound fourth binding rule;
wherein introducing an external variable to expand the third binding rule and the fourth binding rule if all of the following conditions are met: (a) the sensor identifier of the third binding rule is the same as the sensor identifier of the fourth binding rule; (b) the actuator identifier of the third binding rule is the same as the actuator identifier of the fourth binding rule; (c) the event filters of the third binding rule are the same as the event filters of the fourth binding rule; and (d) the action parameters of the third binding rule are not the same as the action parameters of the fourth binding rule, otherwise the merging the first binding rule and the introducing an external variable to expand the third binding rule and the fourth binding rule ends.

7. The method according to claim 1, wherein the application fields comprise a field of safety, a field of security, and a field of comfort.

8. The method according to claim 1, wherein the context information comprises positive information and negative information.

9. A system of binding sensors and actuators automatically, comprising:
a device database, configured to store data of sensors and actuators;
a binding generator, configured to compare the data of the sensors and the data of the actuators in order to generate binding rules between the sensors and the actuators automatically; and
a binding rule database, configured to store the binding rules between the sensors and the actuators,
wherein the device database comprises:
a device function database, configured to store event description data of the sensors and action description data of the actuators, wherein the event description data of the sensors comprises an application field, a measurement field, context information, and event filters; the action description data of the actuators comprises an application field, a measurement field, context information, and action parameters; and the binding generator compares the event description data of the sensors and the action description data of the actuators to generate the binding rules between the sensors and the actuators automatically.

10. The system according to claim 9, wherein the device database further comprises:
a device information database configured to store identifiers and location information of the sensors and the actuators.

11. The system according to claim 10, wherein the binding generator additionally compares location data of the sensors and location data of the actuators to generate the binding rules between the sensors and the actuators automatically.

12. The system according to claim 9, wherein the device database additionally stores preset event filters and action parameters to facilitate a setting of the event filters and the action parameters in event description data of the sensors and action description data of the actuators.

13. The system according to claim 9, wherein the binding generator is further set to compare and merge the binding rules between the sensors and the actuators.

14. The system according to claim 9, wherein the application fields comprise a field of safety, a field of security, and a field of comfort.

15. The system according to claim 9, wherein the context information comprises positive information and negative information.

* * * * *